(12) United States Patent
Graham

(10) Patent No.: US 9,648,851 B2
(45) Date of Patent: May 16, 2017

(54) PET GROOMING ASSEMBLY

(71) Applicant: La Terence Graham, Lake City, SC (US)

(72) Inventor: La Terence Graham, Lake City, SC (US)

( * ) Notice: Subject to any disclaimer, the term of this patent is extended or adjusted under 35 U.S.C. 154(b) by 152 days.

(21) Appl. No.: 14/695,107

(22) Filed: Apr. 24, 2015

(65) Prior Publication Data

US 2016/0309681 A1 Oct. 27, 2016

(51) Int. Cl.
*A01K 13/00* (2006.01)

(52) U.S. Cl.
CPC .......... *A01K 13/003* (2013.01); *A01K 13/002* (2013.01)

(58) Field of Classification Search
CPC .... A01K 13/003; A01K 13/002; A01K 13/00; A46B 11/00
See application file for complete search history.

(56) References Cited

U.S. PATENT DOCUMENTS

| 2,943,602 | A | * | 7/1960 | Rundle | A01K 13/003 119/603 |
|---|---|---|---|---|---|
| 3,597,098 | A | * | 8/1971 | Kellis | A46B 11/0041 401/186 |
| 4,213,423 | A | | 7/1980 | Bryan et al. | |
| 4,277,193 | A | * | 7/1981 | Knaus | A46B 7/02 132/120 |
| 4,865,482 | A | * | 9/1989 | Van Landingham | A01K 13/002 119/664 |
| 5,762,433 | A | | 6/1998 | Cary | |
| 5,823,145 | A | | 10/1998 | Hingiss | |
| 6,024,052 | A | | 2/2000 | Efaw | |
| 6,367,421 | B1 | | 4/2002 | Deacon | |
| D457,729 | S | | 5/2002 | Humphrey | |
| 2007/0084416 | A1 | * | 4/2007 | Liao | A01K 13/002 119/625 |
| 2008/0038044 | A1 | | 2/2008 | Young | |

FOREIGN PATENT DOCUMENTS

WO   WO8601073   2/1986

* cited by examiner

*Primary Examiner* — Monica Williams
*Assistant Examiner* — Jessica Wong

(57) ABSTRACT

A pet grooming assembly includes a brush that has a handle portion and a bristle portion. The bristle portion has a chamber within the bristle portion. The handle portion has a reservoir within the handle portion wherein the reservoir may contain a liquid medication. The chamber and the reservoir are in fluid communication with each other. A valve is movably attached to the brush and the valve selectively inhibits a flow of the liquid medication from the reservoir to the chamber. A plurality of first bristles is attached to the bristle portion wherein each of the first bristles may brush an animal. A plurality of second bristles is attached to the bristle portion. Each of the second bristles is substantially hollow such that each of the second bristles is in fluid communication with the chamber. Thus, each of the second bristles may release the liquid medication onto the animal.

7 Claims, 6 Drawing Sheets

PET GROOMING ASSEMBLY

BACKGROUND OF THE DISCLOSURE

Field of the Disclosure

The disclosure relates to grooming devices and more particularly pertains to a new grooming device for applying a liquid medication to an animal while the animal is brushed.

SUMMARY OF THE DISCLOSURE

An embodiment of the disclosure meets the needs presented above by generally comprising a brush that has a handle portion and a bristle portion. The bristle portion is substantially hollow to define a chamber within the bristle portion. The handle portion is substantially hollow to define a reservoir within the handle portion wherein the reservoir may contain a liquid medication. The chamber and the reservoir are in fluid communication with each other. A valve is movably attached to the brush and the valve is positioned between the reservoir and the chamber. Thus, the valve selectively inhibits a flow of the liquid medication from the reservoir to the chamber. A plurality of first bristles is provided and each of the first bristles is attached to the bristle portion wherein each of the first bristles may brush an animal. A plurality of second bristles is provided and each of the second bristles is attached to the bristle portion. Each of the second bristles is substantially hollow such that each of the second bristles is in fluid communication with the chamber. Thus, each of the second bristles may release the liquid medication onto the animal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
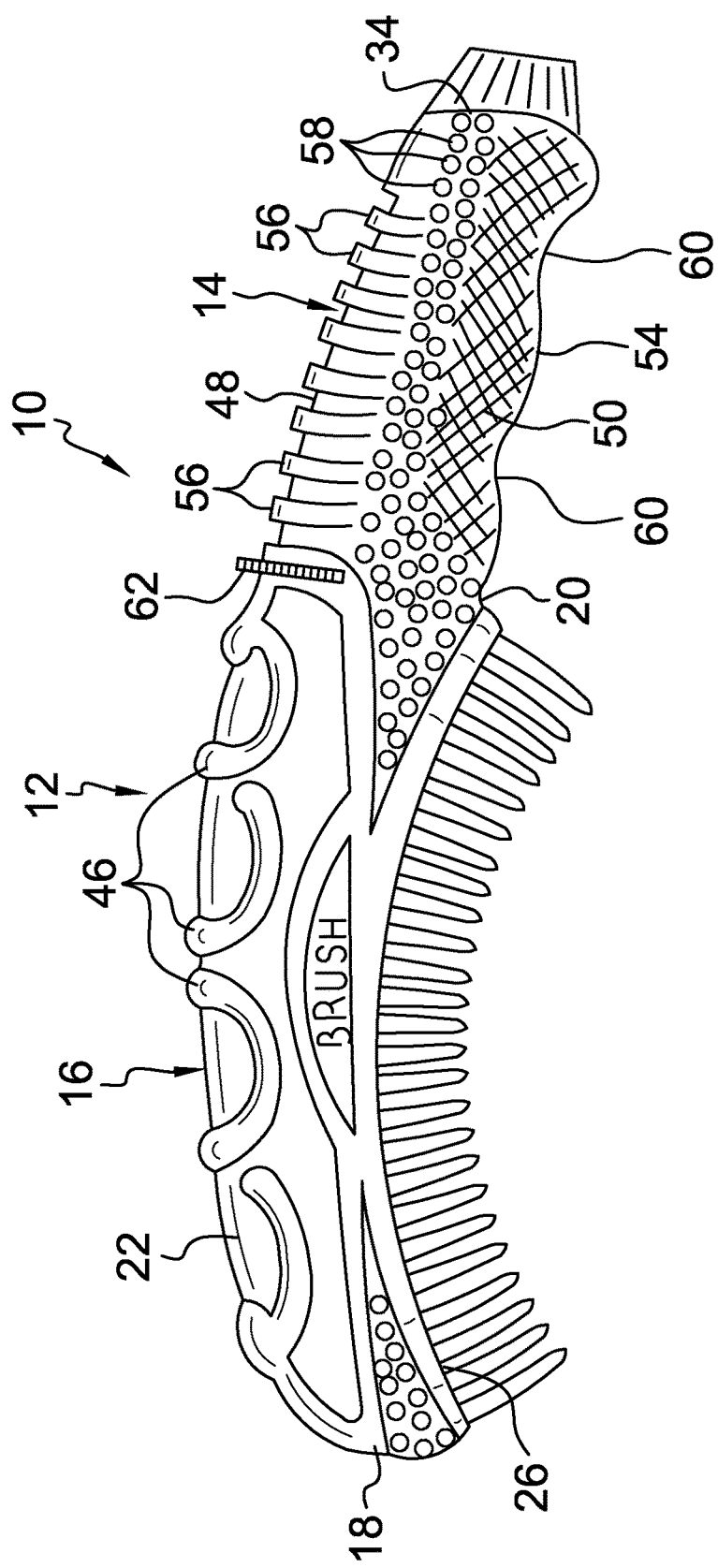
FIG. 1 is a left side view of a pet grooming assembly according to an embodiment of the disclosure.
Figure 2:
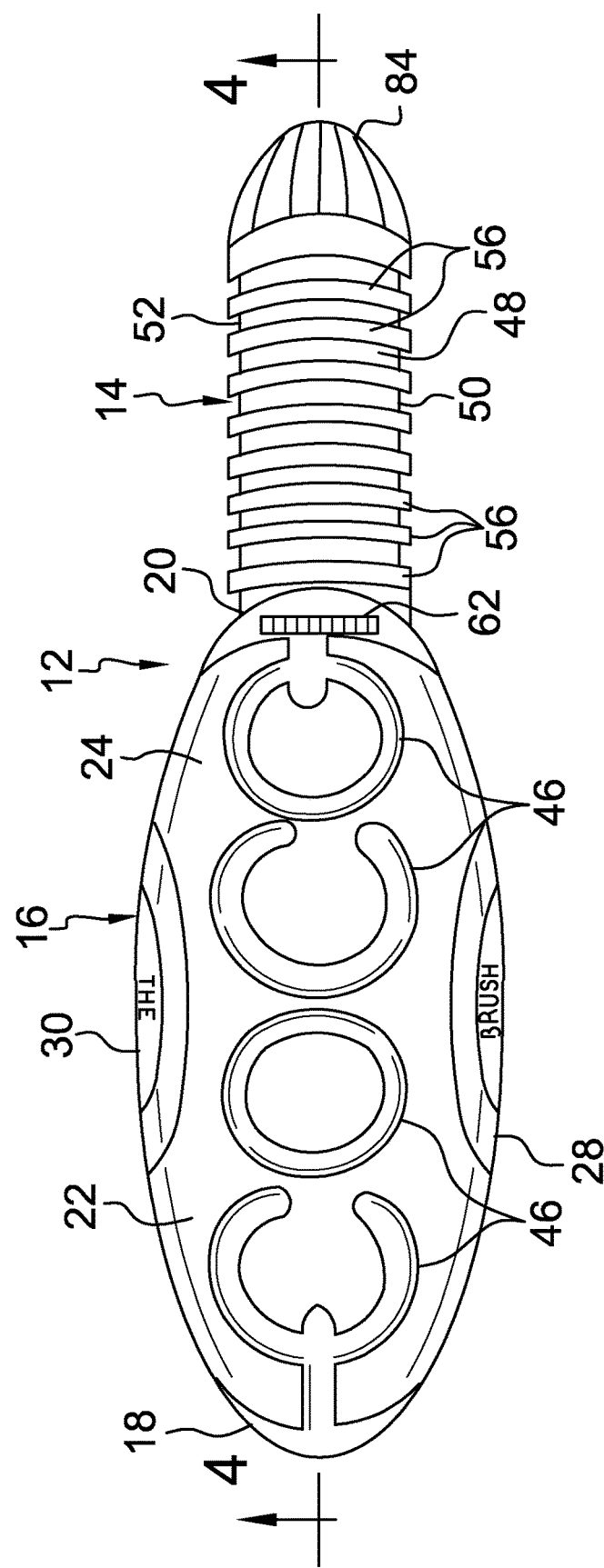
FIG. 2 is a top view of an embodiment of the disclosure.
Figure 3:
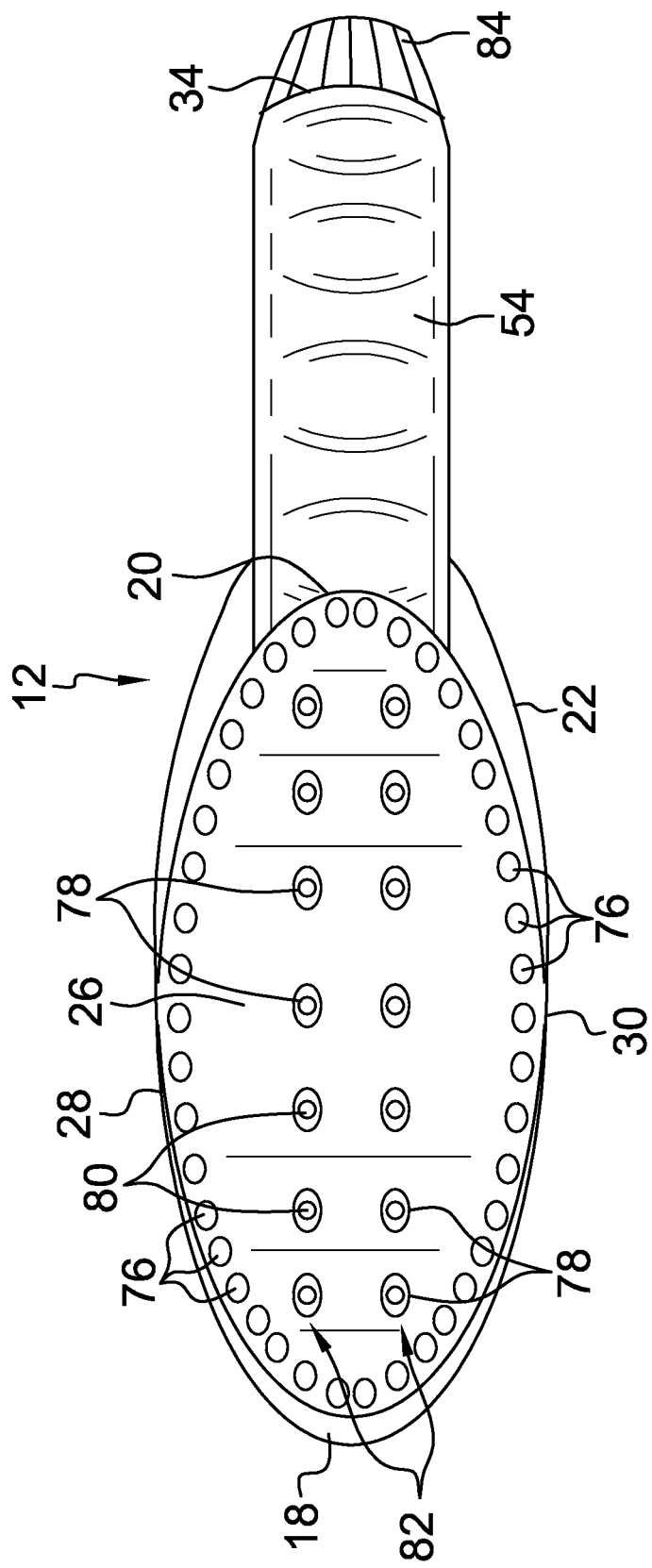
FIG. 3 is a bottom view of an embodiment of the disclosure.
Figure 4:
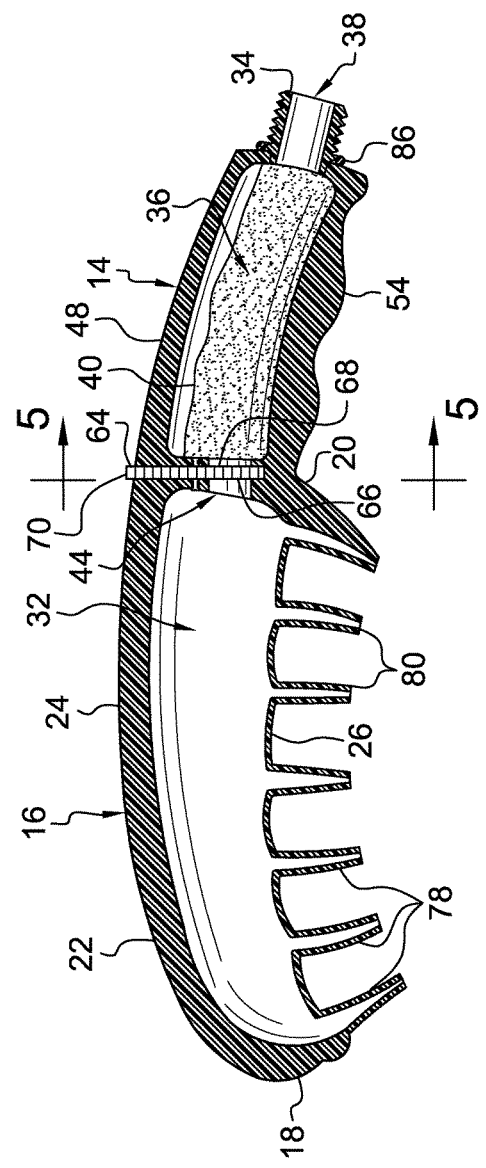
FIG. 4 is a cross sectional view taken along line 4-4 of FIG. 2 of an embodiment of the disclosure.
Figure 5:
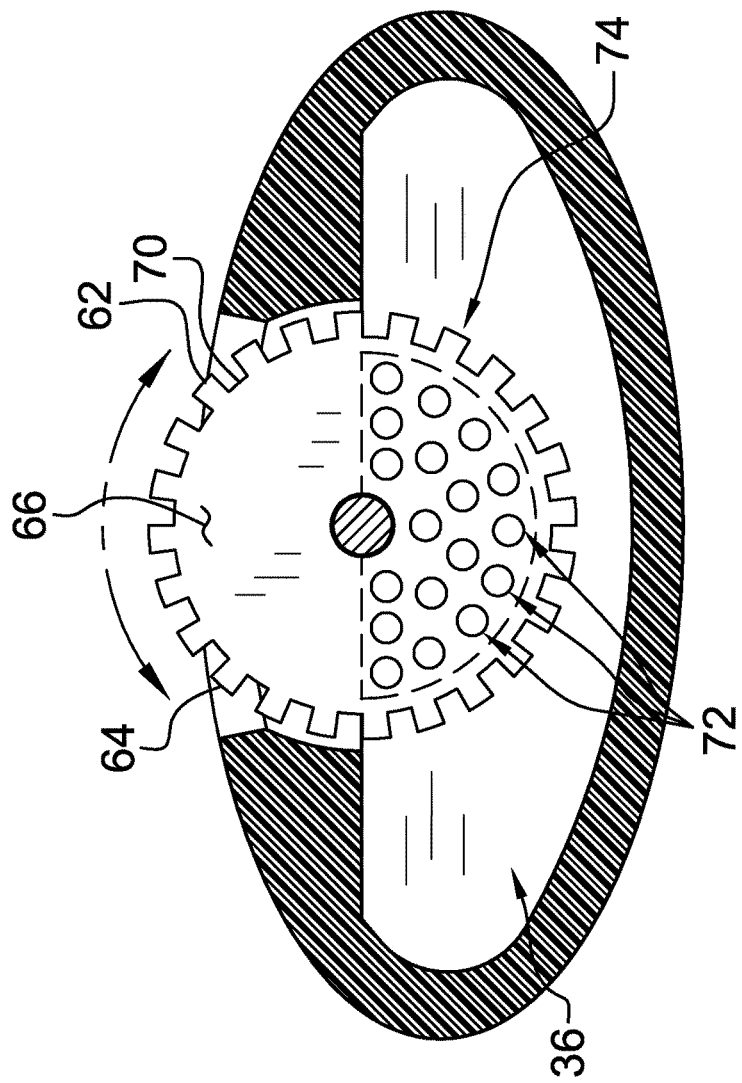
FIG. 5 is a cross sectional view taken along line 5-5 of FIG. 4 of an embodiment of the disclosure.
Figure 6:
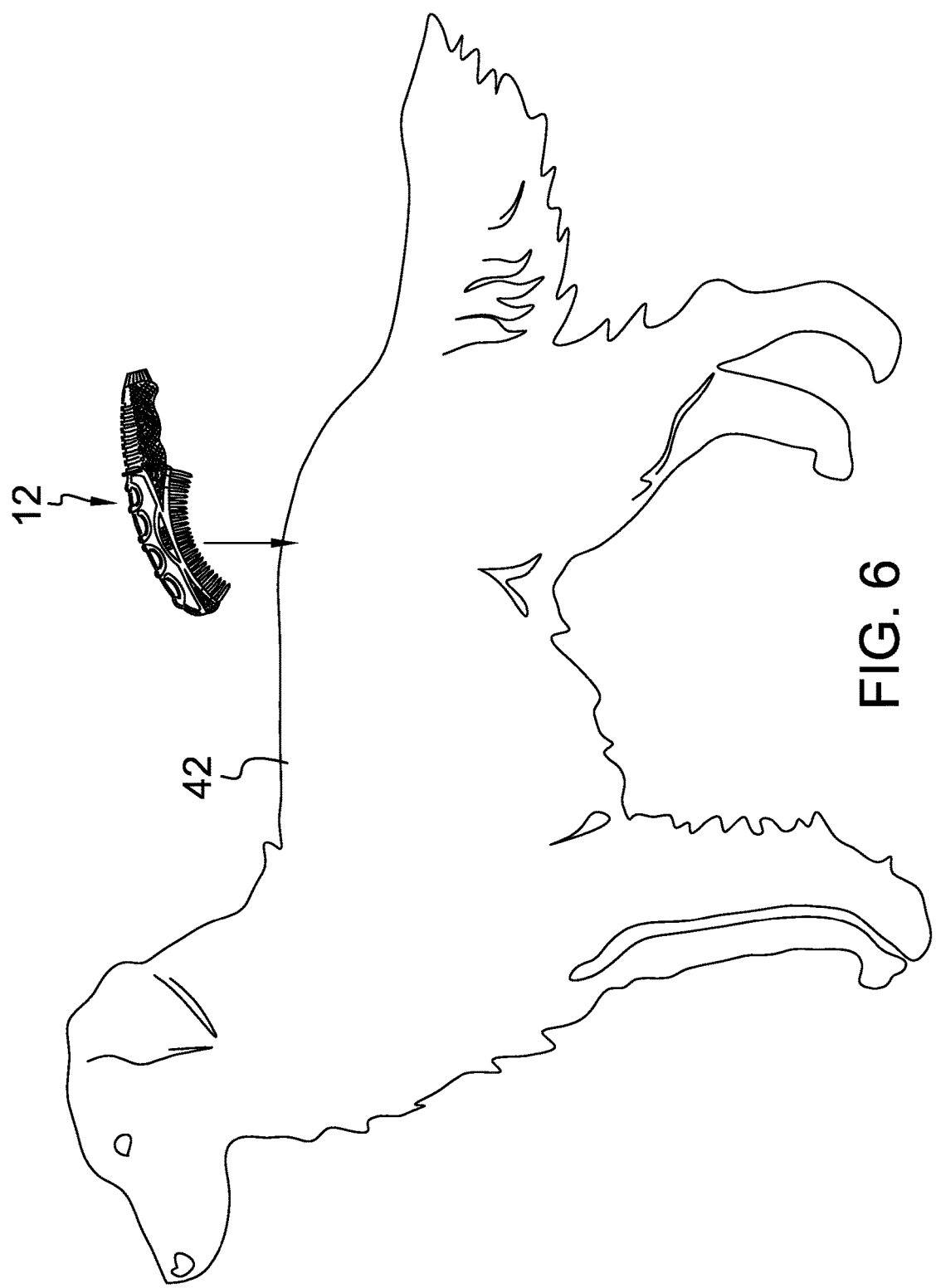
FIG. 6 is a perspective in-use view of an embodiment of the disclosure.

With reference now to the drawings, and in particular to FIGS. 1 through 6 thereof, a new grooming device embodying the principles and concepts of an embodiment of the disclosure and generally designated by the reference numeral 10 will be described.

As best illustrated in FIGS. 1 through 6, the pet grooming assembly 10 generally comprises a brush 12 that has a handle portion 14 and a bristle portion 16. The bristle portion 16 has a front end 18, a rear end 20 and an outer wall 22 extending between the front end 18 and the rear end 20. The outer wall 22 has a top side 24, a bottom side 26, a first lateral side 28 and a second lateral side 30. Each of the first lateral side 28 and the second lateral side 30 is convexly arcuate between the front end 18 and the rear end 20 such that the bristle portion 16 has a substantially ovoid cross section taken perpendicular to a line extending through the top side 24 and the bottom side 26. The bottom side 26 is concavely arcuate between the front end 18 and the rear end 20 and the bristle portion 16 is substantially hollow to define a chamber 32 within the bristle portion 16.

The handle portion 14 extends rearwardly from the rear end 20 and the handle portion 14 has a distal end 34 with respect to the bristle portion 16. The handle portion 14 is substantially hollow to define a reservoir 36 within the handle portion 14. The distal end 34 has an opening 38 extending into the reservoir 36 such that the opening 38 allows the reservoir 36 to be filled with a liquid medication 40. The liquid medication 40 may be a flea and tick treatment for an animal 42 or the like. The brush 12 has a conduit 44 extending between the reservoir 36 and the chamber 32 such that the reservoir 36 is in fluid communication with the chamber 32.

The top side 24 of the bristle portion 16 has a plurality of raised sections 46. The raised sections 46 are arranged to form a word and the word may be "coco". The first lateral side 28 of the bristle portion 16 may have the word "the" printed thereon and the second lateral side 30 may have the word "brush" printed thereon. The handle portion 14 has an upper side 48, a first lateral side 50, a second lateral side 52 and a lower side 54. The upper side 48 has a plurality of ribs 56 extending upwardly therefrom. The ribs 56 are spaced apart from each other and distributed between the bristle portion 16 and the distal end 34 of the handle portion 14.

Each of the first lateral side 50 and the second lateral side 52 of the handle portion 14 are textured with a plurality of raised bumps 58. The ribs 56 and the raised bumps 58 enhance gripping of the handle portion 14. The lower side 54 of the handle portion 14 has a plurality of depressions 60 extending upwardly toward the upper side 48. The depressions 60 are spaced apart from each other and distributed between the bristle portion 34 and the distal end 34 of the handle portion 14.

A valve 62 is movably attached to the brush 12. The valve 62 is positioned between the reservoir 36 and the chamber 32 wherein the valve 62 selectively inhibits a flow of the liquid medication 40 from the reservoir 36 to the chamber 32. The valve 62 comprises a wheel 64 that has a front surface 66, a rear surface 68 and a peripheral edge 70 extends between the front surface 66 and the rear surface 68. The wheel 64 is rotatably coupled to the brush 12 and the wheel 64 is centrally positioned in the conduit 44. The peripheral edge 70 of the wheel 64 extends outwardly from the outer wall 22 of the bristle portion 16 wherein the wheel 64 may be rotated between a closing position and an opening position.

The wheel 64 has a plurality of apertures 72 extending through the front surface 66 and the rear surface 68 and the apertures 72 are spaced apart from each other and distributed on a first half 74 of the wheel 64. Each of the apertures 72 is aligned with the conduit 44 when the wheel 64 is rotated into the opening position wherein the apertures 72 allow the liquid medication 40 to flow from the reservoir 36 into the chamber 32. Each of the apertures 72 is moved away from the conduit 44 when the wheel 64 is rotated into the closing position wherein the wheel 64 restricts the liquid medication 40 from flowing from the reservoir 36 into the chamber 32.

A plurality of first bristles 76 is provided and each of the first bristles 76 is attached to the bristle portion 16. Each of the first bristles 76 is positioned on and extends downwardly from the bottom side 26 of the bristle portion 16. Each of the first bristles 76 is spaced apart from each other and distributed around an entire perimeter of the bottom side 26 wherein each of the first bristles 76 may brush the animal 42. The animal 42 may be a fur bearing household pet or the like.

A plurality of second bristles 78 is provided and each of the second bristles 78 is attached to the bristle portion 16. Each of the second bristles 78 is positioned on and extends downwardly from the bottom side 26. Each of the second bristles 78 has a distal end 80 with respect to the bottom side 26 and the distal end 80 of each of the second bristles 78 is open. Each of the second bristles 78 is substantially hollow such that each of the second bristles 78 is in fluid communication with the chamber 32. Each of the second bristles 78 releases the liquid medication 40 onto the animal 42 when the wheel 64 is rotated into the opening position. The second bristles 78 are spaced apart from each other and arranged in a pair of rows 82 extending between the front end 18 and the rear end 20 of the bristle portion 16. The rows 82 are centrally positioned on the bottom side 26.

A cap 84 is removably attached to the handle portion 14 and the cap 84 threadably engages the distal end 34 of the handle portion 14 such that the cap 84 selectively closes the distal end 34. A gasket 86 is positioned around the handle portion 14 and the gasket 86 is positioned proximate the distal end 34. The cap 84 engages the gasket 86 when the cap 84 is attached to the handle portion 14 such that the gasket 86 forms a fluid impermeable seal with the cap 84. Thus, the gasket 86 prevents the liquid medication 40 from escaping the distal end 34.

In use, the cap 84 is removed and the liquid medication 40 is poured into the reservoir 36. The cap 84 is installed and the wheel 64 is rotated into the opening position. The liquid medication 40 flows into the chamber 32 and outwardly from the second bristles 78. The brush 12 is utilized to brush the animal 42 and the second bristles 78 distribute the liquid medication 40 onto the animal 42 while the animal 42 is brushed. The animal 42 is calmed by being brushed and therefore the liquid medication 40 is easily applied to the animal 42. Brushing the animal 42 facilitates the liquid medication 40 to be applied to an otherwise unruly or agitated animal 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet grooming assembly configured to selectively release a liquid medication, said assembly comprising:
   a brush having a handle portion and a bristle portion, said bristle portion having a bottom side, said bristle portion being substantially hollow to define a chamber within said bristle portion, said handle portion being substantially hollow to define a reservoir within said handle portion wherein said reservoir is configured to contain a liquid medication, said chamber and said reservoir being in fluid communication with each other;
   a valve being movably attached to said brush, said valve being positioned between said reservoir and said chamber wherein said valve is configured to selectively inhibit a flow of the liquid medication from said reservoir to said chamber;
   a plurality of first bristles, each of said first bristles being attached to said bristle portion wherein each of said first bristles is configured to brush an animal, each of said first bristles is positioned on and extending downwardly from said bottom side of said bristle portion, each of said first bristles being spaced apart from each other and distributed in a single row around an entire perimeter of said bottom side; and
   a plurality of second bristles, each of said second bristles being attached to said bristle portion, each of said second bristles being substantially hollow such that each of said second bristles is in fluid communication with said chamber wherein each of said second bristles is configured to release the liquid medication onto the animal;
   where said brush has a conduit extending between said reservoir and said chamber such that said reservoir is in fluid communication with said chamber;
   wherein said valve comprises a wheel being rotatably coupled to said brush, said wheel being centrally positioned in said conduit such that a peripheral edge of said wheel extends outwardly from an outer wall of said bristle portion wherein said wheel is configured to be rotated between a closing position and an opening position;
   wherein said wheel has a plurality of apertures extending there through, said apertures being spaced apart from each other and distributed on a first half of said wheel;
   and wherein each of said apertures is aligned with said conduit when said wheel is rotated into said opening position wherein said apertures are configured to allow the liquid medication to flow from said reservoir into said chamber, each of said apertures being moved away from said conduit when said wheel is rotated into said closing position wherein said wheel is configured to restrict the liquid medication from flowing from said reservoir into said chamber.

2. The assembly according to claim 1, wherein said bristle portion has a front end and rear end where said outer wall extend between said front end and said rear end, said outer wall having a top side, a bottom side, a first lateral side and a second lateral side, each of said first lateral side and said second lateral side being convexly arcuate between said front end and said rear end such that said bristle portion has a substantially ovoid cross section taken perpendicular to a line extending through said top side and said bottom side, said bottom side being concavely arcuate between said front end and said rear end.

3. The assembly according to claim 2, wherein said handle portion extending rearwardly from said rear end, said handle portion having a distal end with respect to said bristle portion, said distal end having an opening extending into said reservoir such that said opening is configured to fill said reservoir with a liquid medication.

4. The assembly according to claim 1, wherein:
said bristle portion has a bottom side, a front end and a rear end; and
each of said second bristles is positioned on and extending downwardly from said bottom side, each of said second bristles having a distal end with respect to said bottom side, said distal end of each of said second bristles being open, said second bristles being spaced apart from each other and arranged in a pair of rows extending between said front end and said rear end of said bristle portion, said pair of rows being centrally positioned on said bottom side.

5. The assembly according to claim 1, further comprising:
said handle portion having a distal end; and
a cap being removably attached to said handle portion, said cap threadably engaging said distal end such that said cap selectively closes said distal end.

6. The assembly according to claim 5, wherein a gasket being positioned around said handle portion, said gasket being positioned proximate said distal end, said cap engaging said gasket when said cap is attached to said handle portion such that said gasket forms a fluid impermeable seal with said cap wherein said gasket is configured to prevent the liquid medication from escaping said distal end.

7. A pet grooming assembly configured to selectively release a liquid medication, said assembly comprising:
a brush having a handle portion and a bristle portion, said bristle portion having a front end, a rear end and an outer wall extending between said front end and said rear end, said outer wall having a top side, a bottom side, a first lateral side and a second lateral side, each of said first lateral side and said second lateral side being convexly arcuate between said front end and said rear end such that said bristle portion has a substantially ovoid cross section taken perpendicular to a line extending through said top side and said bottom side, said bottom side being concavely arcuate between said front end and said rear end, said bristle portion being substantially hollow to define a chamber within said bristle portion, said handle portion extending rearwardly from said rear end, said handle portion having a distal end with respect to said bristle portion, said handle portion being substantially hollow to define a reservoir within said handle portion, said distal end having an opening extending into said reservoir such that said opening is configured to fill said reservoir with a liquid medication, said brush having a conduit extending between said reservoir and said chamber such that said reservoir is in fluid communication with said chamber;

a valve being movably attached to said brush, said valve being positioned between said reservoir and said chamber wherein said valve is configured to selectively inhibit a flow of the liquid medication from said reservoir to said chamber, said valve comprising a wheel having a front surface, a rear surface and a peripheral edge extending between said front surface and said rear surface, said wheel being rotatably coupled to said brush, said wheel being centrally positioned in said conduit such that said peripheral edge of said wheel extends outwardly from said outer wall of said bristle portion wherein said wheel is configured to be rotated between a closing position and an opening position, said wheel having a plurality of apertures extending through said front surface and said rear surface, said apertures being spaced apart from each other and distributed on a first half of said wheel, each of said apertures being aligned with said conduit when said wheel is rotated into said opening position wherein said apertures are configured to allow the liquid medication to flow from said reservoir into said chamber, each of said apertures being moved away from said conduit when said wheel is rotated into said closing position wherein said wheel is configured to restrict the liquid medication from flowing from said reservoir into said chamber;

a plurality of first bristles, each of said first bristles being attached to said bristle portion, each of said first bristles being positioned on and extending downwardly from said bottom side of said bristle portion, each of said first bristles being spaced apart from each other and distributed in a single row around an entire perimeter of said bottom side wherein each of said first bristles is configured to brush an animal;

a plurality of second bristles, each of said second bristles being attached to said bristle portion, each of said second bristles being positioned on and extending downwardly from said bottom side, each of said second bristles having a distal end with respect to said bottom side, said distal end of each of said second bristles being open, each of said second bristles being substantially hollow such that each of said second bristles is in fluid communication with said chamber wherein each of said second bristles is configured to release the liquid medication onto the animal when said wheel is rotated into said opening position, said second bristles being spaced apart from each other and arranged in a pair of rows extending between said front end and said rear end of said bristle portion, said pair of rows being centrally positioned on said bottom side;

a cap being removably attached to said handle portion, said cap threadably engaging said distal end such that said cap selectively closes said distal end; and a gasket being positioned around said handle portion, said gasket being positioned proximate said distal end, said cap engaging said gasket when said cap is attached to said handle portion such that said gasket forms a fluid impermeable seal with said cap wherein said gasket is configured to prevent the liquid medication from escaping said distal end.

\* \* \* \* \*